March 27, 1956     R. L. ROUGEMONT     2,739,773

SELF-ADJUSTING SUPPORT FOR MACHINE TOOL BEDS

Filed Feb. 13, 1952     4 Sheets-Sheet 1

INVENTOR
RENE LOUIS ROUGEMONT
BY *Owen W. Kennedy*
ATTORNEY

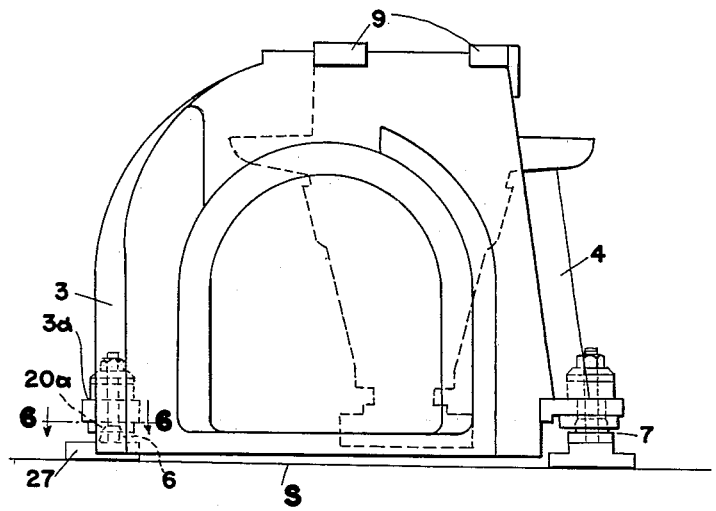
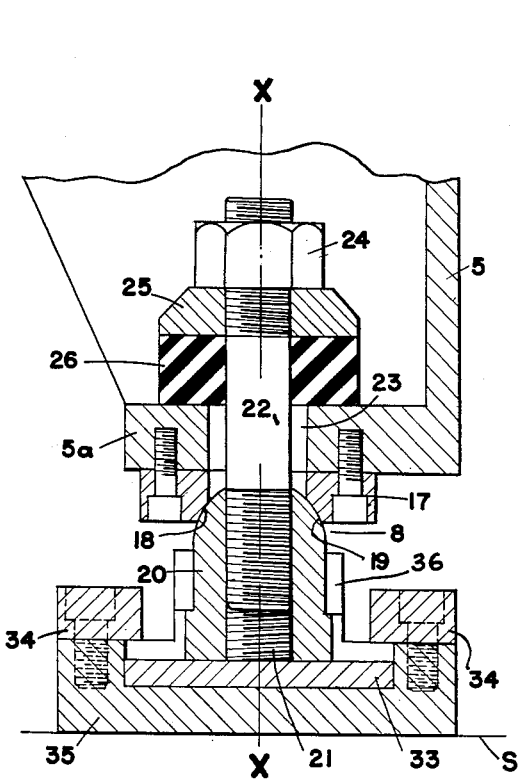

March 27, 1956 R. L. ROUGEMONT 2,739,773
SELF-ADJUSTING SUPPORT FOR MACHINE TOOL BEDS
Filed Feb. 13, 1952 4 Sheets-Sheet 3

INVENTOR
RENE LOUIS ROUGEMONT
BY Owen W. Kennedy
ATTORNEY

March 27, 1956 R. L. ROUGEMONT 2,739,773
SELF-ADJUSTING SUPPORT FOR MACHINE TOOL BEDS
Filed Feb. 13, 1952 4 Sheets-Sheet 4

INVENTOR
RENE LOUIS ROUGEMONT
BY Owen W. Kennedy
ATTORNEY

United States Patent Office 2,739,773
Patented Mar. 27, 1956

2,739,773

SELF-ADJUSTING SUPPORT FOR MACHINE TOOL BEDS

René Louis Rougemont, Worcester, Mass., assignor to Reed-Prentice Corporation, Worcester, Mass., a corporation of Massachusetts Application February 13, 1952, Serial No. 271,355

6 Claims. (Cl. 248—13)

The present invention relates generally to machine tools and has for its object to provide an improved self-adjusting support for the bed of a machine tool. The present invention has particular reference to the mounting of machine tools on supporting surfaces that are subject to distortion or deflection, such as the metal deck plates of ships which are often subjected to temporary deflection during storms at sea, or to permanent deflection sustained in battle action.

The conventional way of mounting a machine tool, such as a lathe, on the metal deck plate of a ship, involves the rigid attachment of the several legs, or base, of the bed to the deck plate by bolts, and sometimes by welding. Therefore, when the deck plate is subjected to strains and deflection, such strains are transmitted to the machine tool bed which provides the spaced parallel ways for slidably supporting various parts of the machine, such as the tool carriage. Assuming that the legs of the bed are rigidly attached to the deck plate by bolts or welds of sufficient strength to anchor the machine tool bed in place, it necessarily follows that deflection of the deck plate results in transmitting forces to the bed sufficient to twist the same and throw the ways out of parallel relation. Should the deck plate be permanently buckled due to battle damage, then the ways will be so twisted as to jam the tool carriage and thereby render the machine tool entirely inoperative, even though it is otherwise undamaged.

According to the present invention the above described difficulties resulting from the conventional mounting of a machine tool on a surface which is subject to deflection have been overcome by providing an improved self-adjusting support for a machine tool bed, with this support functioning so as to compensate for any temporary or permanent deflection of a supporting surface, such as a deck plate, without transmitting any strains to the bed such as would throw the ways out of parallelism and thereby render the machine inoperative.

The above and other advantageous features of the present invention will hereinafter more fully appear from the following description, considered in connection with the accompanying drawings, in which, Fig. 1 is a view in side elevation of a machine tool provided with a self-adjusting support embodying the present invention.

Fig. 3 is an end view of the machine tool shown in Fig. 1, as viewed from the left.

Fig. 4 is a vertical sectional view along the line 4—4 of Fig. 1, looking in the direction of the arrows.

Fig. 5 is an enlarged vertical sectional view along the line 5—5 of Fig. 4 showing the bottom portion of the right-hand leg as it would appear in section looking from the front.

Figure 1:
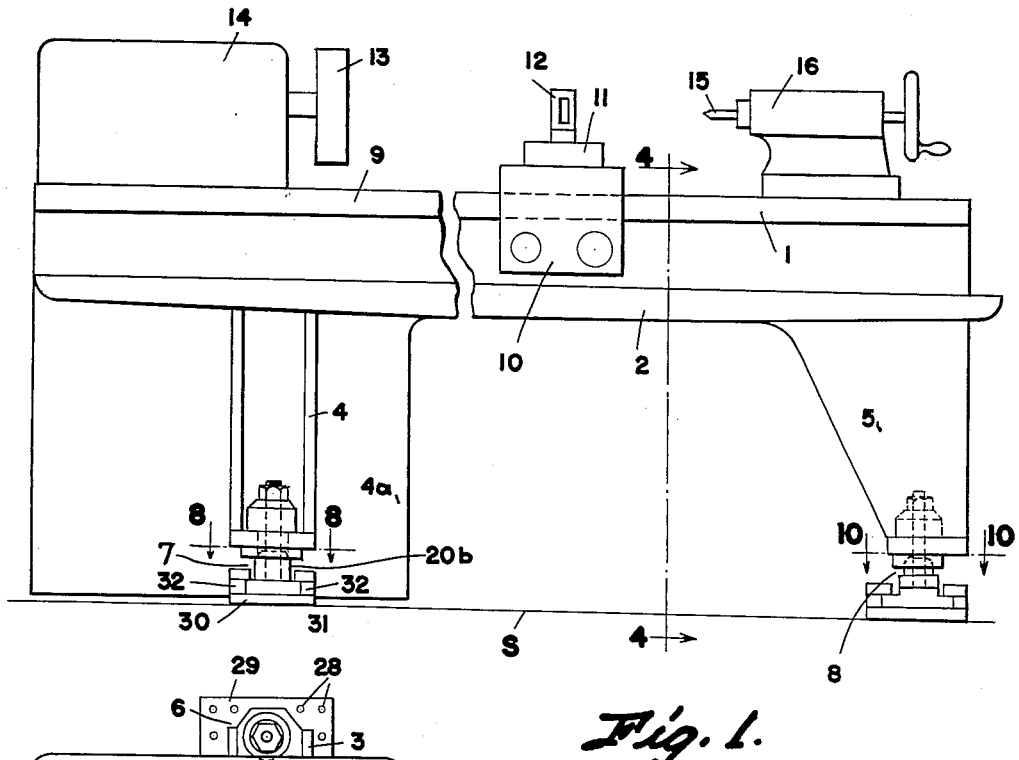
Figure 2:
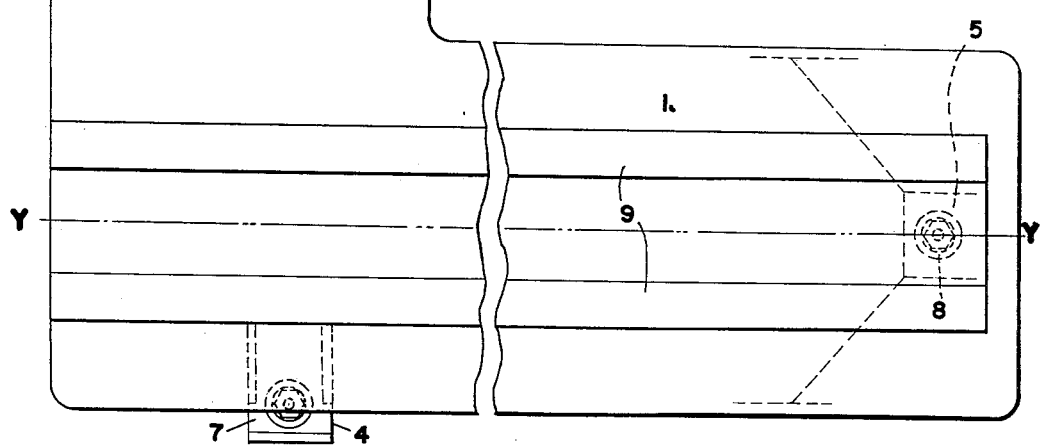
Fig. 2 is a plan view of the machine tool shown in Fig. 1.
Figure 6:
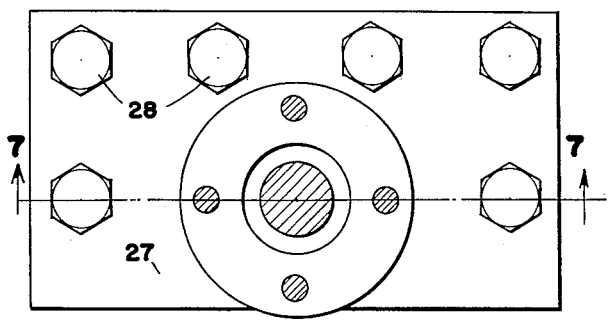
Fig. 6 is an enlarged horizontal sectional view along the line 6—6 of Fig. 3, showing the bottom portion of the rear support as it would appear in section from the top.
Figure 8:
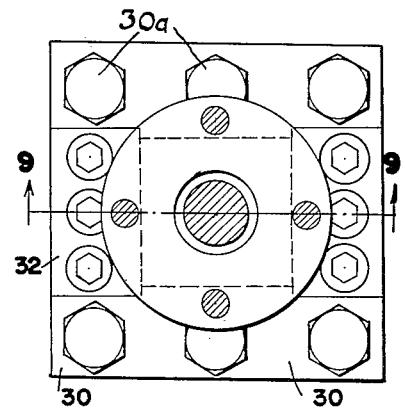
Fig. 8 is an enlarged horizontal sectional view along the line 8—8 of Fig. 1, showing the front support as it would appear from the top.

Referring first to Figs. 1 and 2, the invention is shown for purposes of illustration in connection with a machine tool such as a lathe, although obviously the self-adjusting support of the present invention may be employed in connection with other types of machine tools, in which various parts are supported for relative movement on parallel ways provided by a rigid bed. Generally speaking, the machine tool shown in Figs. 1 and 2 comprises a bed 1 which rests on a horizontally extending base 2, which in turn is supported by three legs 3, 4 and 5 extending downwardly and resting on ball and socket bearings 6, 7 and 8 respectively, which bearings are so constructed as to provide a self-adjusting support for the bed 1, as will later appear.

As best shown in Figs. 2 and 3, the top of the bed 1 serves to support a pair of spaced parallel ways 9 which extend horizontally and, as in all machine tools of this type, provide finished surfaces on which certain parts of the machine tool are movable, for the purpose of adjustment, and for the performance of operations on the work. Fig. 1 shows the ways 9 as serving to slidably support a carriage 10 which carries a tool rest 11 from which the tool post 12 extends upwardly so as to present a cutting tool for operation upon a workpiece supported between the face plate 13 of the headstock 14, and the center 15 of the tailstock 16. In the operation of the lathe it is of the utmost importance that the ways 9 always be in parallel relation, and, as previously pointed out, the object of the present invention is to provide means for supporting the bed 1 which carries the ways 9 in such manner as to absorb or dissipate forces transmitted from the surface S on which the legs 3, 4 and 5 rest. This surface S is shown as being part of a ship's deck plate, the deflection of which would transmit strains to the machine bed sufficient to alter the normal parallel relation between the ways 9, in the absence of some means for preventing such strains.

The ball and socket bearings 6, 7 and 8 are generally similar in construction and Fig. 5 shows the essential parts of the bearing 8 that serves to support the lower end of the single leg 5 which extends downwardly from the base 2 below the tailstock 16. The bearing 8 comprises a socket plate 17 secured to the underside of a foot 5a forming part of the leg 5, and this plate 17 provides a socket 18 having a concave surface of such form as to exactly fit the spherical surface 19 of a sleeve 20 that constitutes the ball element of the ball and socket bearing 8. The ball sleeve 20 is provided with a threaded opening 21 for receiving the threaded end of a stud 22 which extends upwardly through an opening 23 in the foot 5a. It is to be noted that the opening 23 through which the stud 22 extends is considerably larger than the outside diameter of the stud, for a purpose which will later appear.

The upper end of the stud 22 is also threaded to receive a nut 24 which serves to hold a washer 25 in engagement with the upper surface of a cushion sleeve 26 which bears on the upper horizontal surface of the foot portion 5a of the leg 5. The sleeve 26 is composed of resilient material such as rubber, as indicated by the cross hatching, and fits closely around the stud 22 above the opening 23 where the stud passes freely through the foot 5a. When the parts have been assembled as shown in Fig. 5, it is obvious that the nut 24 will serve to exert a pressure on the cushion sleeve 26 through the rigid washer 25, so that the sleeve 26 will be held in contact with the upper surface of the foot portion 5a, while at the same time the socket 18 of the plate 17 will bear upon the spherical surface 19 of the ball sleeve 20.

With this arrangement, the ball sleeve 20 and the stud 22 carried thereby are capable of angular movement with respect to a vertical axis X—X through the ball socket about which the opening 23 is concentric, due to the fact that the cushion sleeve may be compressed to one side or the other of this axis should the ball sleeve 20 tend to turn within its surrounding socket 18 in response to forces transmitted to the ball sleeve 20 from deflection or distortion of the surface S which supports the weight of the leg 5, which surface is part of a deck plate.

The construction of the ball and socket bearing 8, as described above, is duplicated in the bearings 6 and 7 which serve to support the weight of the left-hand end of the base 2 through the legs 3 and 4 respectively, although the ball sleeve of each bearing is supported on the surface S in a different manner, as will next be described. Generally speaking, the manner of supporting the bearings 6, 7 and 8 is such that the rear bearing 6 is capable of pivotal movement only, while the front bearing 7 is so supported as to permit horizontal motion of the sleeve 20b at right angles to the longitudinal axis Y—Y of the bed 1 in addition to pivotal movement. Furthermore, the end bearing 8 has its ball sleeve 20 so supported as to permit motion thereof both at right angles to the bed axis Y—Y, and in a direction parallel to this axis, in addition to pivotal movement through the ball and socket joint.

Figure 7:
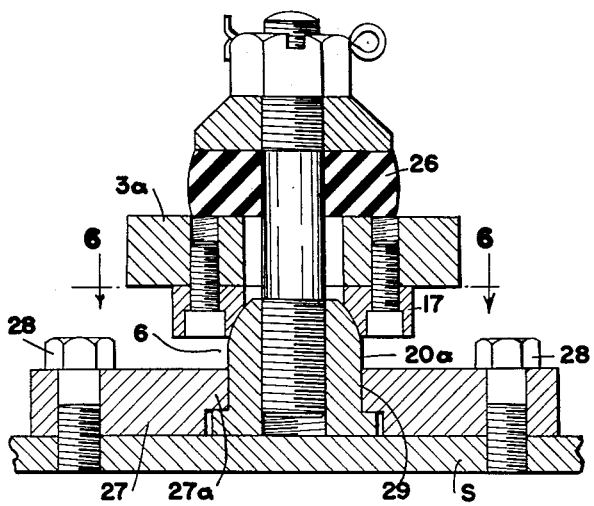
Fig. 7 is a sectional view along the line 7—7 of Fig. 6 showing the bottom portion of the rear support as it would appear in section from the left-hand side.

For the purpose of obtaining the above described movements of the several bearings 6, 7 and 8 which are of identical construction, the ball sleeve 20a of the rear bearing 6 is mounted in a plate 27, which as best shown in Figs. 3 and 7, rests on the surface S which supports the machine tool. The plate 27 is flat on both sides, so that in so far as the leg 3 is concerned any distortion or deflection of the surface S will result only in pivotal movement through the ball and socket joint. In order to hold the plate 27 in position and to prevent it from shifting on the surface S, the plate is secured by bolts 28 as shown in Fig. 7, with the plate 27 providing an opening 29 in which the ball sleeve 20a is held by a shoulder 27a surrounding a flange at the lower end of the sleeve.

Figure 9:
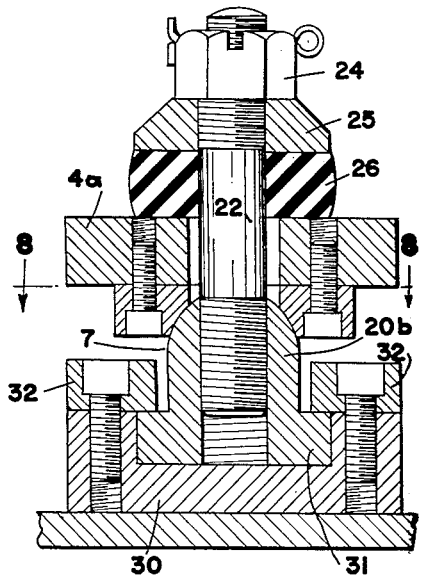
Fig. 9 is a transverse sectional view along the line 9—9 of Fig. 8 showing the front support as it would appear in section from the front.

Referring now to the front leg 4 as shown at the left of Fig. 1, and as shown in detail in Fig. 9, it will be seen that the ball sleeve 20b of the bearing 7 rests on a plate 30 having parallel surfaces with the lower surface of the plate 30 resting on the deck plate surface S. The width of the plate 30 is greater than the width of a flange 31 at the base of the ball sleeve 20b, measured parallel to the axis Y—Y of the bed 1, and the ball sleeve 20b is capable of sliding movement at right angles to this axis between a pair of spaced guides 32 mounted on top of the plate 30. Therefore, the ball sleeve 20b is capable of bodily movement between the guides 32 should the surface S to which the plate 30 is secured by bolts 30a undergo enough deflection to shift the sleeve 20b in one direction or the other, generally at right angles to the axis Y—Y of the machine bed 1. In view of the foregoing description of the construction of the ball and socket joint provided by the bearing 7, it is obvious that any shifting of the sleeve 20b on the plate 30 will be accompanied by pivotal movement between the engaged socket and spherical surface of the bearing with compression of the cushion sleeve 26 to a degree determined by the amount which the stud 22 is tilted with respect to the vertical axis of the opening 23 in the foot portion 4a of the leg 4.

Figure 10:
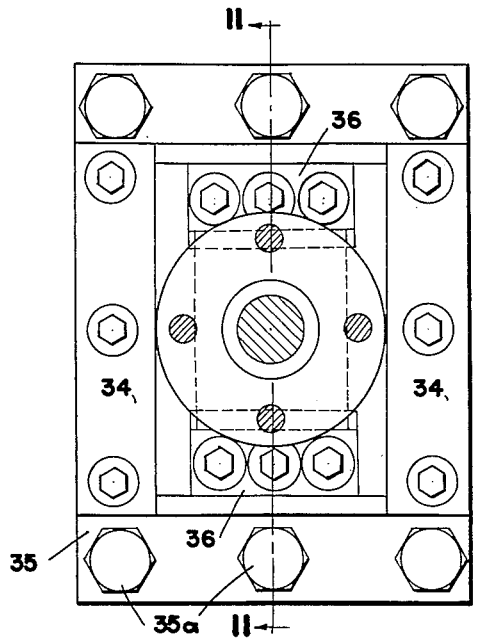
Fig. 10 is an enlarged horizontal sectional view along the line 10—10 of Fig. 1, showing the right-hand support as it would appear from the top.
Figure 11:
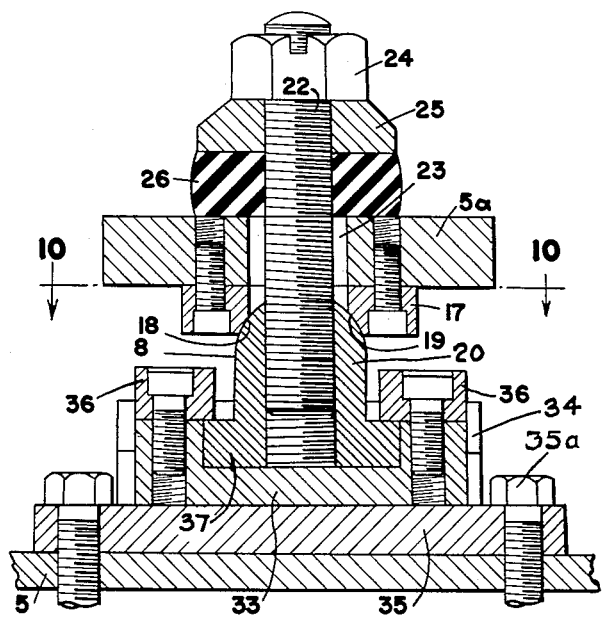
Fig. 11 is a transverse sectional view along the line 11—11 of Fig. 10 showing the right-hand support as it would appear in section from the right-hand side.

Referring now to the right-hand portion of Fig. 1 and also to Figs. 5, 10 and 11, it will be seen that the ball sleeve 20 of the bearing 8 rests on a plate 33 that is capable of sliding movement at right angles to the bed axis Y—Y between spaced parallel guides 34 provided by a base plate 35 which rests on the surface S, and is secured thereto by bolts 35a. It is to be noted that the ball sleeve 20 is also capable of sliding movement on the plate 33 between guides 36 provided by the plate 33 and extending in spaced parallel relation on opposite sides of the central axis Y—Y of the bed 1, as best shown in Fig. 10. In order to hold the base of the ball sleeve 20 in contact with the upper surface of the plate 33, the ball sleeve 20 provides a flange 37 the parallel sides of which are slidably engaged by overhanging portions of the guides 36 on the plate 33.

As a result of the relation between the parts of the bearing 8 as described above, it is apparent that the ball sleeve 20 is capable of shifting movement on the plate 33 in a direction parallel to the axis Y—Y of the bed 1, while at the same time the plate 33 is capable of shifting movement on the base block 35 at right angles to the axis Y—Y. As a result of the engagement of the flange 37 on the sleeve 20 by the overhanging guides 36, the ball sleeve 20 is caused to move bodily with the plate 33 when the latter moves on the block 35 between the guides 34. In other words, the ball sleeve 20 is capable of a compound movement in directions at right angles to each other, while at the same time the foot portion 5a of the foot 5 is capable of pivotal movement as well, by reason of the ball and socket action of the bearing 8.

I claim:

1. In combination with a machine tool bed, means for supporting said bed above a distortable surface consisting of three substantially vertical legs attached at their upper ends to said bed, a ball and socket joint connected to the lower end of each leg, means for immovably attaching a first one of said joints to said surface, means for slidably attaching a second one of said joints to said surface for substantially horizontal sliding movement towards and away from said first joint, and means for slidably attaching the third one of said joints to said surface for substantially horizontal sliding movement in two directions at right angles to each other.

2. In combination with a machine tool bed, means for supporting said bed above a distortable surface consisting of three substantially vertical legs attached at their upper ends to said bed, three substantially horizontal flat plates located below said three legs, respectively, an intermediate ball and socket joint connecting the lower end of each leg to its corresponding plate, means for immovably attaching the plate of one of said legs to said surface, means for slidably attaching the plate of a second of said legs to said surface for substantially horizontal sliding movement towards and away from said first leg, and means for slidably attaching the plate of the third of said legs to said surface for substantially horizontal sliding movement in two directions at right angles to each other.

3. The combination according to claim 2 wherein each ball and socket joint includes a means for yieldably urging said ball into said socket.

4. The combination according to claim 2 wherein each ball and socket joint includes a cylindrical member attached to said ball and projecting through a hole in said socket, said hole being larger in diameter than said cylindrical member, and a resilient means mounted on the projecting end of said cylindrical member for yieldably urging said ball into said socket, whereby a limited relative tilting is provided between each of said legs and said surface.

5. In combination with a machine tool bed, means for supporting said bed above a distortable surface consisting of three substantially vertical legs attached at their upper ends to said bed, a ball socket in the lower end of each leg, a ball element located below each leg, each ball element having a ball portion fitting into the ball socket of its corresponding leg and a sleeve portion projecting downwardly from said ball portion, means for immovably attaching the sleeve portion of a first one of said ball elements to said surface, means for slidably attaching the sleeve portion of a second one of said ball elements to said surface for substantially horizontal sliding movement towards and away from said first ball element, and means for slidably attaching the sleeve portion of the third one of said ball elements to said surface for substantially horizontal sliding movement in two directions at right angles to each other.

6. The combination according to claim 5 including a substantially vertical rod attached to the ball portion of each ball element, each rod projecting through a hole in each socket, each of said holes being larger in diameter than each of said rods, and a resilient means mounted on the upper projecting end of each rod for yieldably urging each ball portion into its respective socket, whereby a limited relative tilting is provided between each of said legs and said surface.

References Cited in the file of this patent

UNITED STATES PATENTS

| | | |
|---|---|---|
| 221,862 | Putnam | Nov. 18, 1879 |
| 681,254 | Northway | Aug. 27, 1901 |
| 1,005,963 | Groat | Oct. 17, 1911 |
| 1,628,620 | Steen | May 10, 1927 |
| 1,753,722 | Schaum | Apr. 8, 1930 |
| 1,786,192 | Cullman | Dec. 23, 1930 |
| 1,987,726 | Wilkerson | Jan. 26, 1935 |
| 2,408,169 | Hoffer | Sept. 24, 1946 |
| 2,456,959 | La Mont | Dec. 21, 1948 |
| 2,634,069 | Drake | Apr. 7, 1953 |